US012574671B2

(12) United States Patent
Ke et al.

(10) Patent No.: US 12,574,671 B2
(45) Date of Patent: Mar. 10, 2026

(54) EARPHONE BOX-ENTERING DETECTION METHOD AND APPARATUS, AND NON-TRANSITORY COMPUTER-READABLE STORAGE MEDIUM

(71) Applicant: BEIJING XIAOMI MOBILE SOFTWARE CO., LTD., Beijing (CN)

(72) Inventors: Changqing Ke, Beijing (CN); Hua Wang, Beijing (CN); Xiaodan Feng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 210 days.

(21) Appl. No.: 18/378,107

(22) Filed: Oct. 9, 2023

(65) Prior Publication Data

US 2025/0039592 A1 Jan. 30, 2025

(30) Foreign Application Priority Data

Jul. 25, 2023 (CN) .......................... 202310920891.1

(51) Int. Cl.
*H04R 1/1025* (2026.01)
*H02J 7/00* (2006.01)

(52) U.S. Cl.
CPC ........ *H04R 1/1025* (2013.01); *H02J 7/00045* (2020.01); *H02J 7/0045* (2013.01); *H04R 2201/029* (2013.01); *H04R 2420/07* (2013.01)

(58) Field of Classification Search
CPC ............ H04R 1/1025; H04R 2201/029; H04R 2420/07; H04R 2460/17; H04R 1/1041; H04R 2201/105; H02J 7/00045; H02J 7/0045

See application file for complete search history.

(56) References Cited

U.S. PATENT DOCUMENTS

| 2012/0300961 A1* | 11/2012 | Moeller | .............. A61B 5/4542 |
| | | | 381/122 |
| 2023/0134920 A1 | 5/2023 | Su et al. | |

FOREIGN PATENT DOCUMENTS

| CN | 112533097 A | 3/2021 |
| CN | 115119106 A | 9/2022 |
| CN | 115314796 A | 11/2022 |

OTHER PUBLICATIONS

Extended European Search Report issued in Application No. 23205700.0-1207, dated Mar. 28, 2024,(7p).

* cited by examiner

*Primary Examiner* — Tuan D Nguyen
(74) *Attorney, Agent, or Firm* — Arch & Lake LLP; Hao Tan; Shen Wang

(57) ABSTRACT

The present disclosure provides an earphone box-entering detection method, an apparatus, and a non-transitory computer-readable storage medium. The method includes: acquiring an acoustic signal picked up by an earphone; and determining that the earphone is in a box-entering state in response to determining that the acoustic signal matches a predetermined acoustic signal in the earphone. Through the present disclosure, the design can be simple and the cost is not high.

18 Claims, 4 Drawing Sheets acquiring an acoustic signal picked up by an earphone — S101 determining that the earphone is in a box-entering state when it is determined that the acoustic signal matches a predetermined acoustic signal in the earphone — S102

S401 determining that the earphone is in a box-entering state, and performing a box-entering operation

S402 sending a charging request to the earphone box in response to that the earphone has established a charging connection with the earphone box

100

101

Acquiring unit

102

Processing unit

EARPHONE BOX-ENTERING DETECTION METHOD AND APPARATUS, AND NON-TRANSITORY COMPUTER-READABLE STORAGE MEDIUM

CROSS-REFERENCE TO RELATED APPLICATION

This application is based on and claims the benefit of priority to Chinese Patent Application No. 202310920891.1, filed on Jul. 25, 2023, the disclosure of which is hereby incorporated by reference in its entirety for all purposes.

BACKGROUND

With the development of wireless communication technology, the application of intelligent and wireless earphones is more and more extensive. True Wireless Stereo (TWS) Bluetooth earphone is a typical one of wireless earphones. A TWS earphone contains two parts, earphone and earphone box. Usually, the charging box needs to detect box-entering of the earphone in time when the earphone enters the box, then charge the earphone and carry out a series of information interaction.

At present, most earphone boxes require adding additional sensors therein to determine whether the earphones are in the box-entering state.

SUMMARY

The present disclosure relates to the field of TWS earphone box-entering detection technology, and more specifically, to an earphone box-entering detection method and apparatus, and a non-transitory computer-readable storage medium. In order to overcome the problems existing in the related technology, the present disclosure provides an earphone box-entering detection method and apparatus, and a non-transitory computer-readable storage medium.

According to a first aspect of embodiments of the present disclosure, there is provided an earphone box-entering detection method, including: acquiring an acoustic signal picked up by an earphone; and determining that the earphone is in a box-entering state if it is determined that the acoustic signal matches a predetermined acoustic signal in the earphone.

According to a second aspect of embodiments of the present disclosure, there is provided an earphone box-entering detection apparatus, including: a processor; a memory for storing instructions executable by the processor; wherein the processor, by executing the instructions, is configured to acquire an acoustic signal picked up by an earphone; and determine that the earphone is in a box-entering state if it is determined that the acoustic signal matches a predetermined acoustic signal in the earphone.

According to a third aspect of embodiments of the present disclosure, there is provided an earphone, including: a processor; a memory for storing instructions executable by the processor; where the processor is configured to perform acts according to the first aspect or any implementation of the first aspect.

According to a fourth aspect of embodiments of the present disclosure, there is provided a non-transitory computer-readable storage medium, have stored thereon instructions, which, when executed by a processor of a terminal, enables the terminal to execute the method or detecting an earphone entering a box according to the first aspect or any implementation of the first aspect.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the description, illustrate embodiments consistent with the present disclosure and, together with the description, serve to explain the principles of the present disclosure.

DETAILED DESCRIPTION

Description will now be made in detail to embodiments, examples of which are illustrated in the accompanying drawings. The following description refers to the accompanying drawings in which the same numbers in different drawings represent the same or similar elements unless otherwise indicated. The implementations in the following description of embodiments do not represent all implementations consistent with the present disclosure.

With the development of wireless communication technology, the application of intelligent and wireless earphones is more and more extensive. True Wireless Stereo (TWS) Bluetooth earphone is a typical one of wireless earphones. A TWS earphone contains two parts, earphone and earphone box. Usually, the charging box needs to detect box-entering of the earphone in time when the earphone enters the box, then charge the earphone and carry out a series of information interaction.

At present, most earphone boxes require adding additional sensors therein, such as Hall switch detection, acceleration sensor detection, light sensor detection, etc., and even the presentence of a way to detect by using the principle of capacitance current, so as to determine whether the earphones are in a box-entering state.

However, the above detection manners have the following problems:

1. The Hall principle detection is a more mainstream detection method at present, this method is relatively reliable, but it requires adding additional Hall switches and requires adding additional magnets in the box, which is complicated in design and high in cost.

2. As for the principle of light perception change, it is easy to misjudge such scenario of occlusion, resulting in poor user experience.

3. The principle of acceleration induction is difficult to control the tolerance of false triggering, and it is easy to misjudge in some scenarios, resulting in poor user experience.

4. The principle of capacitive current is complicated in circuit design and high in cost.

In view of this, the embodiments of the present disclosure provide an earphone box-entering detection method. In this earphone box-entering detection method, there is no need to add additional sensors or additional noise signals, and it only needs to pick up sound by the microphone MIC in the earphone, and it is determined whether the earphone enters the box in combination with an algorithm. Through the earphone box-entering detection method provided in the embodiments of the present disclosure, not only the design is simple, the cost is not high, but also the algorithm control is relatively simple.

Figure 1:
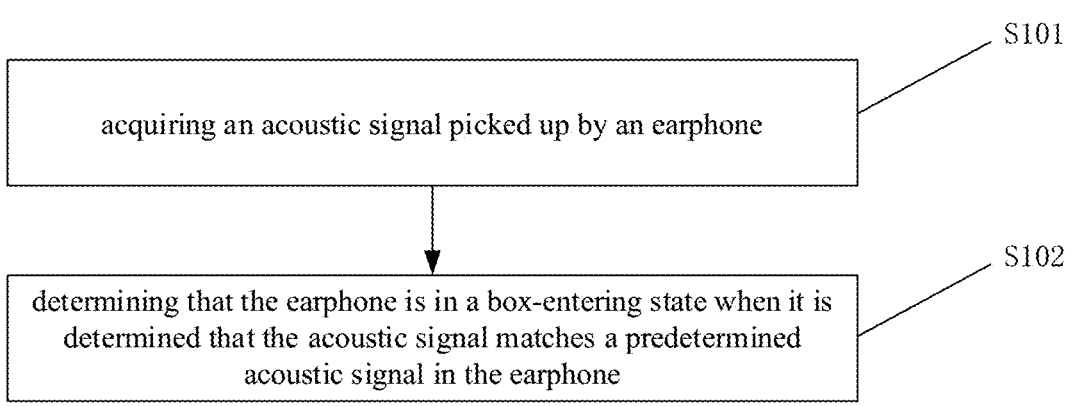
FIG. 1 is a flowchart of an earphone box-entering detection method shown according to an embodiment.

FIG. 1 is a flowchart of an earphone box-entering detection method shown according to an embodiment, as shown in FIG. 1, the earphone box-entering detection method is used in a TWS earphone and includes the following steps.

In step S101, an acoustic signal picked up by an earphone is acquired.

In step S102, it is determined that the earphone is in a box-entering state if it is determined that the acoustic signal matches a predetermined acoustic signal in the earphone.

In an embodiment of the present disclosure, the predetermined acoustic signal includes at least one of the following: an acoustic signal determined based on a collision between the earphone and an earphone box, an acoustic signal of tapping the earphone box, and an acoustic signal by which a user sends a target instruction. The acoustic signal determined based on the collision between the earphone and the earphone box is mainly taken as an example in various embodiments of the present disclosure, for the convenience of the following description. It can be understood that the acoustic signal picked up by the earphone in the earphone box-entering detection method provided by the present disclosure is not limited to this.

In an embodiment of the present disclosure, an acoustic signal picked up by a target microphone is acquired. Here, the target microphone includes a microphone whose power consumption is lower than a threshold when data processing is performed.

In another embodiment of the present disclosure, an acoustic signal picked up by a target microphone is acquired. Here, the target microphone can be a smart microphone (Smart MIC). In addition, the power consumption of the target microphone during data processing is lower than a threshold, for example, a smart microphone with the processing capability of a low-power Digital Signal Processing (DSP) chip is used.

In an embodiment of the present disclosure, pickup and algorithm processing of the acoustic signal can be realized by a DSP chip. The acoustic signal can be picked up by a target microphone with a DSP chip in the earphone, the picked-up acoustic signal can be processed according to the DSP chip, and it can be determined that the earphone is already in the box-entering state when the processed acoustic signal matches the predetermined acoustic signal in the earphone.

Herein, in an embodiment of the present disclosure, the sound of collision refers to the noise signal of collision caused by the accelerated contact between the head magnet of the wireless earphone and the magnet arranged in the earphone box, it is an instantaneous sound. This sound is used to detect the box-entering operation. Herein, this noise signal is very obvious in terms of time, and it can be clearly distinguished from the loudness of the acoustic signal, the size of the acoustic signal, the frequency of the acoustic signal and other characteristics to compare with other noise.

In an embodiment of the present disclosure, noise signals can be understood as signals generated by different objects, which are useless acoustic signal to human ears.

However, at present, in the manner of using acoustics to detect whether the earphone enters the box, it is necessary to add a speaker in the earphone box. The earphone box is opened when the earphone box is closed, in which case it shows that the user wants to put the wireless earphone in the earphone box, and the earphone box starts the speaker arranged in the earphone box. A certain predetermined audio signal is continuously played through the speaker, the audio signal sent by the earphone box is acquired through the microphone of the earphone when the wireless earphone is put into the earphone box, thereafter compared with the predetermined audio signal in the earphone, and it is determined that the wireless earphone has completed the box-entering operation if the acquired audio signal sent by the earphone box is the same as the predetermined audio signal in the earphone. In this way, it is necessary to arrange a separate speaker in the earphone box, which is not only expensive, but also complicated in process, and also needs to add additional noise signals, the user experience is greatly reduced.

However, in the earphone box-entering detection method in the embodiments of the present disclosure, it is not necessary to additionally set the noise signal through the earphone box, but only needs to pick up the acoustic signal generated by the collision between the wireless earphone and the earphone box, the acoustic signal of knocking on the earphone box, the acoustic signal of the user issuing a target instruction, and the like through the target microphone of the wireless earphone. The acoustic signal picked up by the microphone of the earphone is compared with the predetermined acoustic signal in the wireless earphone to determine whether the wireless earphone is in the box-entering state.

Herein, it can be understood that the predetermined acoustic signal in the embodiments of the present disclosure is a signal that can be obtained without improving the structure of the earphone box.

Figure 2:
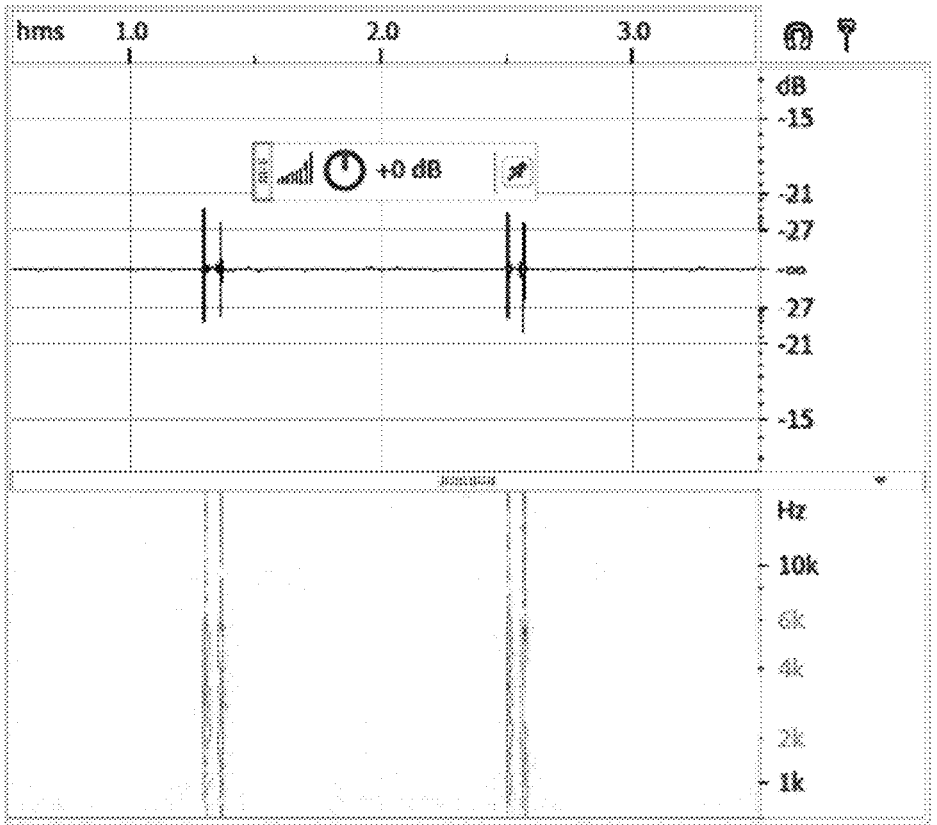
FIG. 2 is a schematic diagram of an earphone box-entering detection method shown according to an embodiment.

Herein, the collision acoustic signal picked up by the target microphone of the wireless earphone is compared with the predetermined signal. The predetermined acoustic signal in the wireless earphone is an experimental value, which is obtained from many times of collision of the wireless earphone with the earphone box. The sound after collision resulting from many times of experiment is very stable, and such type of acoustic signal after collision has obvious characteristics. As shown in FIG. 2, it can be seen from the time domain that the acoustic signal determined from the collision between the wireless earphone and the earphone box has obvious characteristics, which can be distinguished from the noise signals in other scenes, and has good consistency, whether through algorithm adjustment or machine learning, it is easy to realize the earphone box-entering detection by this collision signal. Therefore, the sound after collision can be used as the predetermined sound of the wireless earphone and compared with the acoustic signal picked up by the target microphone of the wireless earphone. It can be determined that the wireless earphone is in the box-entering state when characteristics of the acoustic signal received by the target microphone of the wireless earphone are the same as those of the predetermined acoustic signal of the wireless earphone. The earphone is not in the box-entering state if the acoustic signal does not match the predetermined acoustic signal in the earphone.

In the above embodiments, only the principle of acoustic detection is needed to detect the earphone box-entering, there is no need to add additional sensors or noise signals, which is simple in design, low in cost and simple in algorithmic control. The acoustic signals determined for earphones and earphone boxes with the same serial numbers have a single nature, and therefore it has high reliability in the method of detecting entry of the earphone into the box.

Figure 3:
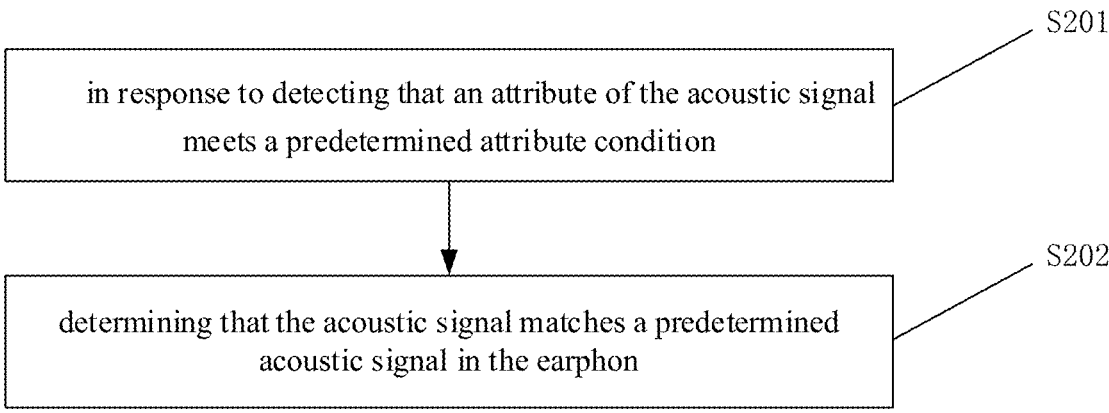
FIG. 3 is a flowchart of determining that the earphone is in a box-entering state when it is determined that the acoustic signal matches a predetermined acoustic signal in the earphone shown according to an embodiment.

FIG. 3 is a flowchart of determining that the earphone is in a box-entering state if it is determined that the acoustic signal matches a predetermined acoustic signal in the earphone shown according to an embodiment, as shown in FIG. 3, the following steps are included.

In step S201, in response to detecting that an attribute of the acoustic signal meets a predetermined attribute condition.

In step S202, it is determined that the acoustic signal matches the predetermined acoustic signal in the earphone.

In an embodiment of the present disclosure, the attribute includes at least one of: duration, loudness and frequency.

In an embodiment of the present disclosure, encoding information obtained by decoding an acoustic signal includes: tone, timbre and loudness. Herein, any complex sound can be described by these three attributes, which correspond to three physical quantities of sound pressure: frequency, phase and amplitude.

In an embodiment of the present disclosure, the encoding information of the acoustic signal can be divided into a time domain and a frequency domain. Herein, in the algorithm for detecting whether the earphone enters the box, the concrete realization process is: in terms of the time domain, the duration of sound, the loudness of sound, where the loudness of sound can also be understood as the amplitude that the acoustic signal crosses, both belong to the biggest characteristics in the time domain. In terms of the frequency domain, the earphone continuously picks up different sounds through the target microphone from one frequency to another frequency, the frequency span is different.

In an embodiment of the present disclosure, the serial number of the earphone box in the collision between the wireless earphone and the earphone box is consistent with that of the wireless earphone.

For example, when the serial number of the earphone box is consistent with the serial number of the wireless earphone, the wireless earphone and the matching earphone box are made of the same material, such as material A. Further, when an earphone made of material A collides with an object made of material which is not the material A of the earphone box matched with the wireless earphone, such as an object made of material B, or an object made of material C, the frequencies generated by picking up the sounds that the earphone collides with objects made of different materials through the target microphone of the earphone are all different. In other words, in the earphone box-entering detection method provided by the present disclosure, the frequency corresponding to the predetermined acoustic signal determined based on the sound of the collision between the wireless earphone and the matching earphone box is unique. The frequency characteristic mainly determines the tone of the sound.

In an embodiment of the present disclosure, the predetermined acoustic signal has tolerance, and its tolerance range is relatively wide. There may be production tolerance in the production of earphones and earphone boxes, so the collision sounds between different earphones and their matching earphone boxes picked up many times may be different. For example, the duration, the amplitude and the frequency of acoustic signals of collision of individual earphones are different. Therefore, the present disclosure sets a reasonable tolerance range for the predetermined acoustic signal, so as to lock the acoustic signals generated by the collision between different earphones and their respective matching earphone boxes.

In another embodiment of the present disclosure, the predetermined acoustic signal is an experimental value, which is set in the following two ways. First, an audio signal is measured through a large number of experimental data, and then the collision sound generated by the earphone and the earphone box is identified according to the self-learning method. Second, upper and lower limits are set, and the limits are set relatively wide, as long as the time and height corresponding to the picked-up acoustic signal are within these limits, the acoustic signal can be considered as the collision sound generated by the earphone and the earphone box. Herein, the upper and lower limits are set by the algorithm, the algorithm is helpful to improve the recognition efficiency through the continuous self-learning stage, and the probability of false detection and missing detection is small.

In the conventional technology, only when the acoustic signal picked up by the microphone is basically consistent with the predetermined acoustic signal can it be determined that the earphone enters the box, there is no situations such as misjudgment or misoperation, and the noise signal picked up by the microphone is an audio signal that is set additionally. However, in the earphone box-entering detection method provided by the present disclosure, it is necessary to match the acoustic signal picked up by the earphone microphone and detect the characteristics such as the duration and amplitude of the picked-up acoustic signal, and it can be determined that the earphone enters the earphone box when the acoustic signal is all within the tolerance range of the predetermined acoustic signal after being converted into frequency.

Through the embodiment provided by the present disclosure, the acoustic recording device MIC in the earphone can be fully utilized, additional sensors are not added, and the stacking space in the earphone can be effectively saved. Moreover, because the present disclosure saves the extra sensor modules, it can save the cost of developing extra modules for the project and reduce the complexity of assembly and production.

Figure 4:
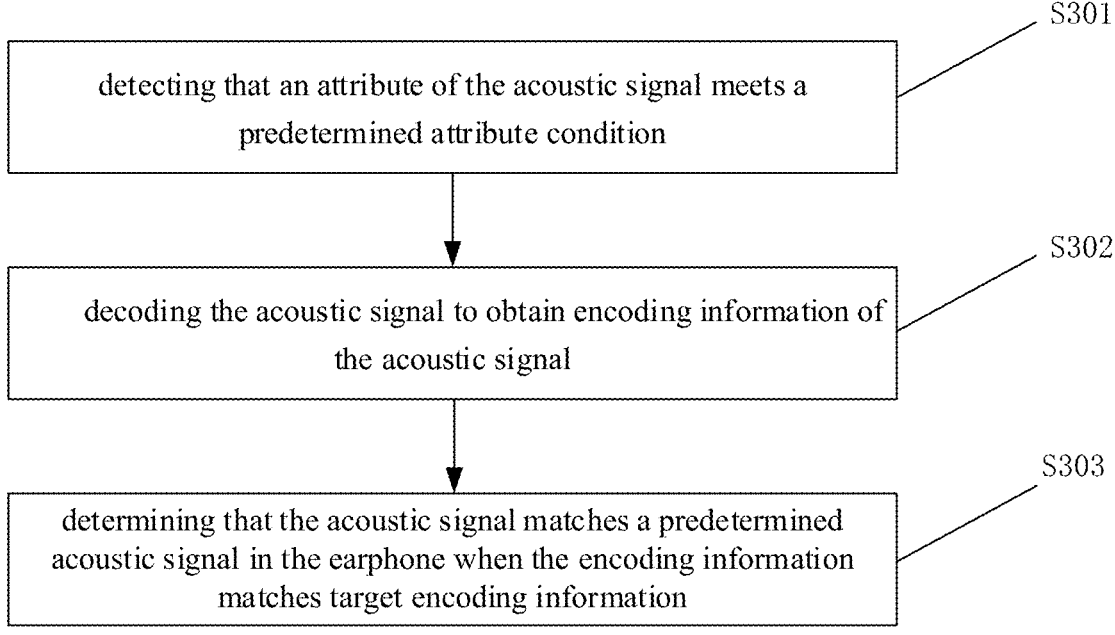
FIG. 4 is a flowchart of an earphone box-entering detection method shown according to an embodiment.

FIG. 4 is a flowchart of an earphone box-entering detection method shown according to an embodiment, as shown in FIG. 4, it includes the following steps.

In step S301, it is detected that an attribute of the acoustic signal meets a predetermined attribute condition.

As for the specific implementation of step S301, reference can be made to the specific implementation of step S201 in FIG. 3, and details will not be explained here.

In step S302, the audio signal is decoded to obtain encoding information of the audio signal.

In step S303, it is determined that the acoustic signal matches a predetermined acoustic signal in the earphone if the encoding information matches target encoding information.

In an embodiment of the present disclosure, the predetermined acoustic signal is obtained by encoding the target encoding information.

In an embodiment of the present disclosure, it is determined whether the encoding information obtained by decoding the acoustic signal matches the target encoding information. Herein, the predetermined acoustic signal is obtained by encoding the acoustic signal according to the target encoding information. Therefore, the earphone stores in advance the target encoding information and the predetermined acoustic signal obtained from encoding based on the target encoding information.

In an embodiment of the present disclosure, the wireless earphone decodes the acoustic signal after obtaining the acoustic signal, and it is determined that the acoustic signal is not an acoustic signal for box-entering detection if the obtained encoding information does not contain the target encoding information. If the obtained encoding information contains encoding information, it can be further determined whether the acoustic signal is used for box entry detection by determining whether the encoding information matches the target encoding information.

In an embodiment of the present disclosure, after detecting that the attribute of the acoustic signal meets the predetermined attribute condition, the acoustic signal is decoded to obtain corresponding encoding information, and then whether the encoding information matches the target encoding information is determined by comparison. It is determined that the acoustic signal matches the predetermined acoustic signal in the earphone if the encoding information matches the target encoding information.

In another embodiment of the present disclosure, the acoustic signal picked up by the target microphone can be decoded by a DSP chip, and the target encoding information can be encoded by a DSP chip to obtain a predetermined acoustic signal. The method is not only simple in terms of implementation, but also low in cost and high in recognition reliability.

In another embodiment of the present disclosure, a use state of the wireless earphone is determined, and the use state includes a wearing state and a non-wearing state.

In an embodiment of the present disclosure, when a target microphone in an earphone acquires an audio signal, it is necessary to process the picked-up acoustic signal. The earphone picks up an acoustic signal generated by the surrounding environment when the user takes off the earphone from the ear. For example, when the user accidentally bumps the earphone on a desktop or wall while wearing the earphone, the sound of that the earphone collides with other objects is also generated at this moment, and the earphone also picks up the acoustic signal and compares it with the predetermined acoustic signal. It is detected that the acoustic signal, which is resulted from that the earphone collides with other objects except the earphone box, is different from the predetermined acoustic signal, many factors such as the length and amplitude of the acoustic signal are not matched.

In the above embodiments, because the wireless earphone and the earphone box are matching products, the material and structure between them are fixed, and the frequency produced by the collision sound generated by the wireless earphone and the earphone box is also fixed. Through the earphone box-entering detection method provided by the present disclosure, there is no need to add the additional noise signals, and only the collision sound generated by the wireless earphone and the earphone box is used as the judgment basis for detecting whether the earphone enters the box.

Figure 5:
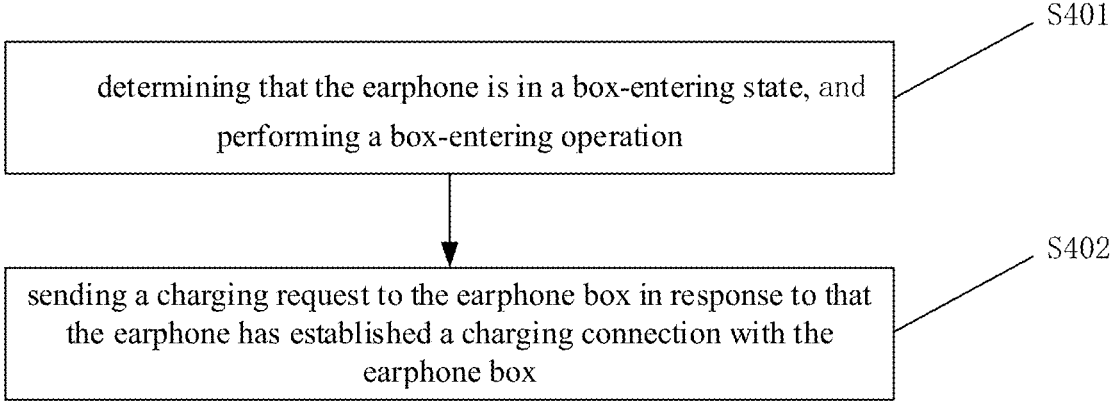
FIG. 5 is a flowchart of an earphone box-entering detection method shown according to an embodiment.

FIG. 5 is a flowchart of an earphone box-entering detection method shown according to an embodiment, as shown in FIG. 5, it includes the following steps.

In step S401, it is determined that the earphone is in the box-entering state, and the box-entering operation is performed.

In step S402, a charging request is sent to the earphone box in response to that the earphone has established a charging connection with the earphone box.

In an embodiment of the present disclosure, the charging request is used for requesting the earphone box to charge the earphone.

In an embodiment of the present disclosure, for example, an earphone box and a wireless Bluetooth earphone. The earphone box is in an open state, the earphone box enters a working state in the process of opening the earphone box, the wireless Bluetooth earphone is equivalent to being in the working state in the process of taking off the wireless Bluetooth earphone from the user's ear, and the target microphone inside the wireless Bluetooth earphone is also in a power-on state. When the user puts the wireless Bluetooth earphone into the earphone box, because the magnets between the earphone and the earphone box attract each other, there will be a crash sound, such as "pa", which lasts for a short time, about several milliseconds.

In an embodiment of the present disclosure, the earphone picks up the generated collision sound through an internally arranged target microphone, where the earphone is still in the power-on state at this time. When the collision sound picked up by the target microphone is detected and compared with the predetermined acoustic signal, and the predetermined acoustic signal is satisfied, it can prove that the earphone is already in a state of being inside the earphone box.

In an embodiment of the present disclosure, the earphone has established a charging connection with the earphone box, and the connection can be established by contacting charging magnetic needles in the earphone box through contacts at the bottom of the earphone. On this basis, the earphone box can be informed of that the earphone has entered the earphone box through a charging contact piece for charging the earphone in the earphone box, the earphone box supplies power to the earphone, and the earphone is in a shutdown state.

In another embodiment of the present disclosure, a charging connection is established between the earphone and the earphone box, which is convenient for reminding the earphone box that the earphone is in the box, stopping the power-on state of the earphone, that is, disconnecting the connection between the earphone and the connecting device, and supplying power to the earphone through the earphone box, such that the power consumption of the earphone can be reduced and unnecessary power consumption can be avoided.

In an embodiment of the present disclosure, the wireless earphone continuously optimizes the tolerance of the predetermined acoustic signal, such as loudness, timbre and the like, by collecting a large amount of experimental data through self-learning. Herein, the timbre can reflect the resonant frequency, that is, when the earphone collides with objects of different materials, the proportion of homophonic components is different, resulting in different sounds.

Herein, in another embodiment of the present disclosure, the process of self-learning can be understood as the process of product update iteration. Contemporary earphones can set a tolerance of the acoustic signal in advance, and detect misjudged data in these data according to feedback data, such as the data collected before the earphone is turned off, the tolerance of the acoustic signal set in advance before can be modified according to these data, so as to reduce the phenomenon of misjudgment and enhance the user's sense of use in the next generation of products.

In an embodiment of the present disclosure, the process of earphone self-learning can be self-learning through the earphone itself during the use of the earphone, but the process of continuous self-learning consumes a lot of power consumption of the earphone. Thus, for the process of self-learning, the embodiment of the present disclosure is more inclined to complete the process of self-learning before the product leaves the factory, in other words, the tolerance of the acoustic signal of the contemporary earphones is set by self-learning through a large amount of data of the previous generations, and the predetermined acoustic signal in the earphones is fixed after the product leaves the factory. By constant updating and iterations, the existence of errors is continuously reduced.

In the embodiments of the present disclosure, the left and right wireless earphones do not affect each other, and there are no interaction actions between them. For example, when it is detected that the earphone entering the earphone box is a wireless earphone of the left ear, the earphone box can be informed of, through the contact chip of the wireless earphone of the left ear, that the wireless earphone of the left ear is in a non-wearing state and in a box-entering state, and then the wireless earphone of the left ear stops working, and the earphone box supplies power to the wireless earphone of the left ear. But in this process, it has no effect on the wireless earphone of the right ear.

Based on the same concept, the embodiments of the present disclosure further provide an earphone box-entering detection apparatus.

It can be understood that, in order to realize the above functions, the earphone box-entering detection apparatus provided by the embodiments of the present disclosure includes corresponding hardware structures and/or software modules for executing the respective functions. In combination with the units and algorithm steps of the respective examples disclosed in the embodiments of the present disclosure, the embodiments of the present disclosure can be implemented in the form of hardware or a combination of hardware and computer software. As for whether a certain function is performed by hardware or in the manner of computer software driving hardware, it depends on the specific application and design constraint of the technical solutions. Those skilled in the art can use different methods to realize the described functions for each specific application, but this realization should not be considered as beyond the scope of the technical solutions of the embodiments of the present disclosure.

Figure 6:
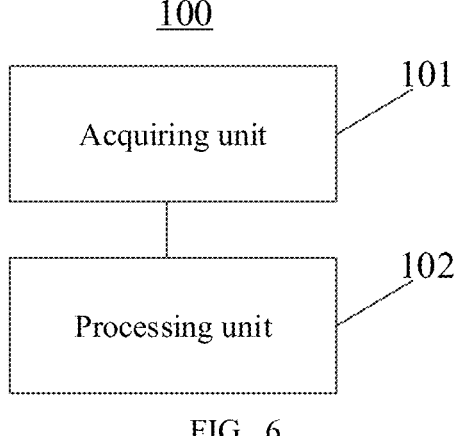
FIG. 6 is a block diagram of an earphone box-entering detection apparatus shown according to an embodiment.

FIG. 6 is a block diagram of an earphone box-entering detection apparatus 100 shown according to an embodiment. Referring to FIG. 6, the apparatus 100 includes an acquiring unit 101 and a processor 102.

The acquiring unit 101 is configured to acquire an acoustic signal picked up by an earphone.

The processor 102 is configured to determine that the earphone is in a box-entering state if it is determined that the acoustic signal matches a predetermined acoustic signal in the earphone, and perform a box-entering operation, the predetermined sound signal is a sound signal determined based on a collision between the earphone and an earphone box.

In an implementation, the acquiring unit 101 is configured to acquire an acoustic signal picked up by a target microphone, where the target microphone includes a microphone whose power consumption is lower than a threshold when data processing is performed.

In an implementation, the processor 102 is configured to determine that the acoustic signal matches a predetermined acoustic signal in the earphone in response to detecting that an attribute of the acoustic signal meets a predetermined attribute condition; the attribute includes at least one of: duration, loudness and frequency.

In an implementation, the processor 102 is further configured to, after detecting that an attribute of the acoustic signal meets a predetermined attribute condition, decode the acoustic signal to obtain encoding information of the acoustic signal; and determine that the acoustic signal matches a predetermined acoustic signal in the earphone if the encoding information matches target encoding information, where the predetermined acoustic signal is obtained by encoding the target encoding information.

In an implementation, the processor 102 is further configured to, after determining that the earphone is in a box-entering state and performing a box-entering operation, send a charging request to the earphone box in response to that the earphone has established a charging connection with the earphone box, where the charging request is used for requesting the earphone box to charge the earphone.

In an implementation, the predetermined acoustic signal includes at least one of the following: an acoustic signal determined based on a collision between the earphone and an earphone box; an acoustic signal of tapping the earphone box; and an acoustic signal by which a user sends a target instruction.

The specific manners in which operations are executed by the respective modules in the apparatus of the above embodiments have been described in detail in the embodiments regarding the method, and details will not be repeated herein.

Figure 7:
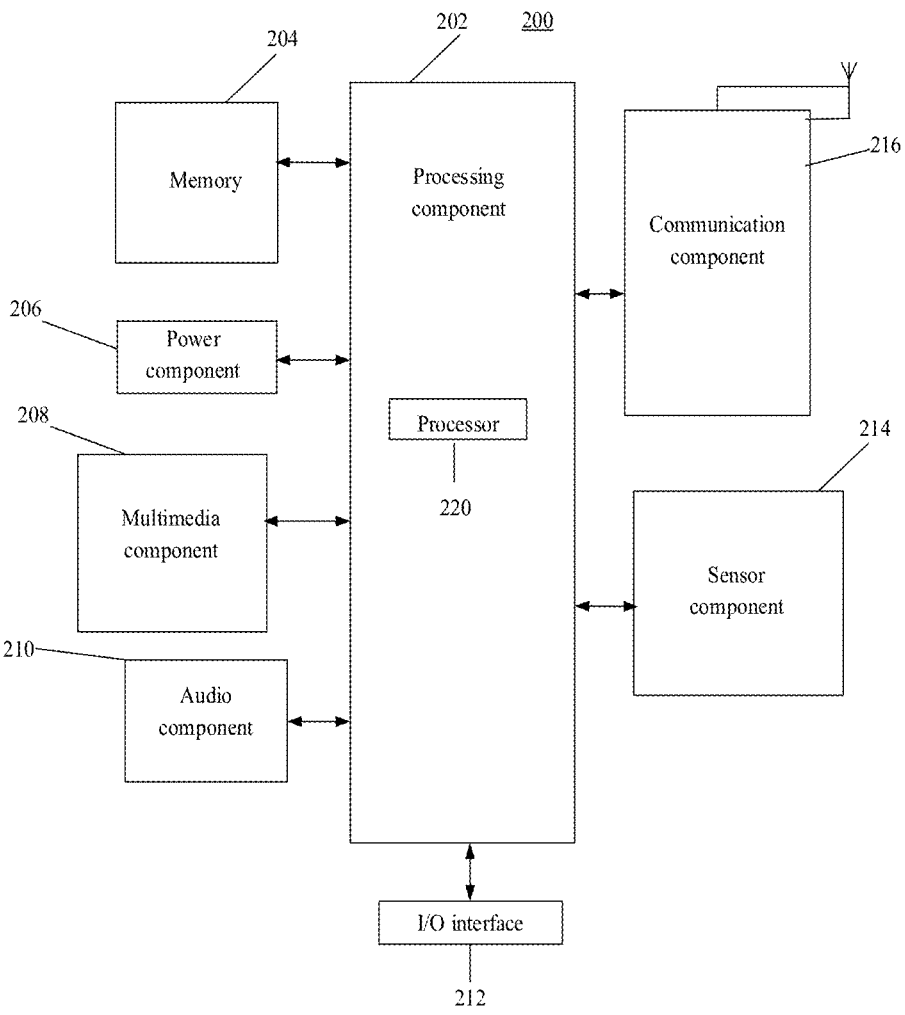
FIG. 7 is a block diagram of a device for detecting earphone box-entering shown according to an embodiment.

FIG. 7 is a block diagram of a device 200 for detecting earphone box-entering shown according to an embodiment. For example, the device 200 can be a mobile phone, a computer, a digital broadcast terminal, a messaging device, a gaming console, a tablet, a medical device, exercise equipment, a personal digital assistant, and the like.

Referring to FIG. 7, the device 200 can include one or more of the following components: a processing component 202, a memory 204, a power component 206, a multimedia component 208, an audio component 210, an input/output (I/O) interface 212, a sensor component 214, and a communication component 216.

The processing component 202 typically controls overall operations of the device 200, such as the operations associated with display, telephone calls, data communications, camera operations, and recording operations. The processing component 202 can include one or more processors 220 to execute instructions to perform all or part of the steps in the above described methods. Moreover, the processing component 202 can include one or more modules which facilitate the interaction between the processing component 202 and other components. For instance, the processing component 202 can include a multimedia module to facilitate the interaction between the multimedia component 208 and the processing component 202.

The memory 204 is configured to store various types of data to support the operation of the device 200. Examples of such data include instructions for any applications or methods operated on the device 200, contact data, phonebook data, messages, pictures, video, etc. The memory 204 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 206 provides power to various components of the device 200. The power component 206 can include a power management system, one or more power sources, and any other components associated with the generation, management, and distribution of power in the device 200.

The multimedia component 208 includes a screen providing an output interface between the device 200 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 208 includes a front camera and/or a rear camera. The front camera and the rear camera can receive an external multimedia datum while the device 200 is in an operation mode, such as a photographing mode or a video mode. Each of the front camera and the rear camera can be a fixed optical lens system or have focus and optical zoom capability.

The audio component 210 is configured to output and/or input audio signals. For example, the audio component 210 includes a microphone ("MIC") configured to receive an external audio signal when the device 200 is in an operation mode, such as a call mode, a recording mode, and a voice recognition mode. The received audio signal can be further stored in the memory 204 or transmitted via the communication component 216. In some embodiments, the audio component 210 further includes a speaker to output audio signals.

The I/O interface 212 provides an interface between the processing component 202 and peripheral interface modules, such as a keyboard, a click wheel, buttons, and the like. The buttons can include, but are not limited to, a home button, a volume button, a starting button, and a locking button.

The sensor component 214 includes one or more sensors to provide status assessments of various aspects of the device 200. For instance, the sensor component 214 can detect an open/closed status of the device 200, relative locating of components, e.g., the display and the keypad, of the device 200, a change in position of the device 200 or a component of the device 200, a presence or absence of user contact with the device 200, an orientation or an acceleration/deceleration of the device 200, and a change in temperature of the device 200. The sensor component 214 can include a proximity sensor configured to detect the presence of nearby objects without any physical contact. The sensor component 214 can also include a light sensor, such as a CMOS or CCD image sensor, for use in imaging applications. In some embodiments, the sensor component 214 can also include an accelerometer sensor, a gyroscope sensor, a magnetic sensor, a pressure sensor, or a temperature sensor.

The communication component 216 is configured to facilitate communication, wired or wirelessly, between the device 200 and other devices. The device 200 can access a wireless network based on a communication standard, such as Wi-Fi, 2G, 3G, or a combination thereof. In one embodiment, the communication component 216 receives a broadcast signal or broadcast associated information from an external broadcast management system via a broadcast channel. In one embodiment, the communication component 216 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In embodiments, the device 200 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In embodiments, there is further provided a non-transitory computer-readable storage medium including instructions, such as included in the memory 204, executable by the processor 220 in the device 200, for performing the above described acts. For example, the non-transitory computer-readable storage medium can be a ROM, a RAM, a CD-ROM, a magnetic tape, a floppy disc, an optical data storage device, and the like.

The technical solutions provided by embodiments of the present disclosure can achieve the following advantages: an acoustic signal picked up by an earphone is acquired, where it is determined that the earphone is in a box-entering state when it is determined that the acoustic signal matches a predetermined acoustic signal in the earphone, and a box-entering operation is performed. The predetermined acoustic signal in the present disclosure is an acoustic signal determined based on a collision between the earphone and the earphone box. The present disclosure detects box-entering of the wireless earphone by using the principle of acoustic detection, the present disclosure not only has a simple design and a low cost, but also does not need to add additional noise, user experience is improved.

It can be understood that "a plurality of" in the present disclosure refers to two or more, and other quantifiers are similar. The "and/or", which describes the association relationship of related objects, means that there can be three types of relationship, for example, A and/or B can mean three cases that A exists alone, A and B exist together, and B exists alone. The character "/" generally indicates that the associated objects in the context are of an "or" relationship. The singular forms "a/an", "the" and "said" are also intended to include the plural forms, unless the context clearly indicates other meaning.

It can be further understood that the terms "first" and "second" and the like are used to describe various types of information, but these information should not be limited to these terms. These terms are only used to distinguish the same type of information from each other and do not indicate a specific sequence or importance. In fact, the expressions "first" and "second" and the like can be used interchangeably. For example, without departing from the scope of the present disclosure, the first information can also be referred to as the second information, and similarly, the second information can also be referred to as the first information.

It can be further understood that unless otherwise specified, "connection" includes direct connection between two without other components, and also includes indirect connection between two with other components.

It can be further understood that although the operations are described in a specific order in the drawings in the embodiments of the present disclosure, it should not be understood that these operations are required to be performed in the specific order or in the serial order shown, or all the operations shown are required to be performed to obtain the desired results. In certain circumstances, multitasking and parallel processing can be beneficial.

Other embodiments of the present disclosure can be available to those skilled in the art upon consideration of the specification and practice of the various embodiments disclosed herein. The present application is intended to cover any variations, uses, or adaptations of the present disclosure following general principles of the present disclosure and including the common general knowledge or conventional technical means in the art. The specification and embodiments can be shown as illustrative only, and the true scope and spirit of the present disclosure are indicated by the following claims.

It will be understood that the present disclosure is not limited to the exact construction that has been described above and illustrated in the accompanying drawings, and that various modifications and changes can be made without departing from the scope thereof. It is intended that the scope of the present disclosure is limited only by the appended claims.

What is claimed is:

1. An earphone box-entering detection method, comprising:

acquiring an acoustic signal picked up by an earphone; and determining that the earphone is in a box-entering state in response to determining that the acoustic signal matches a predetermined acoustic signal in the earphone, wherein the predetermined acoustic signal is a signal obtained without modifying a structure of the earphone box, without requiring a separate speaker in the earphone box, and without requiring additional sensors.

2. The method according to claim 1, wherein the predetermined acoustic signal comprises at least one of the following acoustic signals:

an acoustic signal determined based on a collision between the earphone and an earphone box;

an acoustic signal generated by tapping the earphone box; or an acoustic signal through which a user sends a target instruction.

3. The method according to claim 1, wherein determining that the acoustic signal matches the predetermined acoustic signal in the earphone comprises:

determining that the acoustic signal matches the predetermined acoustic signal in the earphone in response to detecting that an attribute of the acoustic signal meets a predetermined attribute condition; and wherein the attribute comprises at least one of following the attributes: duration, loudness, or frequency.

4. The method according to claim 3, wherein after detecting that the attribute of the acoustic signal meets the predetermined attribute condition, the method further comprises:

obtaining encoding information of the acoustic signal by decoding the acoustic signal; and determining that the acoustic signal matches the predetermined acoustic signal in the earphone in response to determining that the encoding information matches target encoding information, wherein the predetermined acoustic signal is obtained by encoding the target encoding information.

5. The method according to claim 1, wherein acquiring the acoustic signal picked up by the earphone comprises:

acquiring the acoustic signal picked up by a target microphone, wherein the target microphone comprises a microphone whose power consumption is lower than a threshold when data processing is performed.

6. The method according to claim 1, wherein after determining that the earphone is in a box-entering state, the method further comprises:

sending a charging request to an earphone box in response to determining that the earphone has established a charging connection with the earphone box, wherein the charging request is used to request the earphone box to charge the earphone.

7. An earphone box-entering detection apparatus, comprising:

a processor;

a memory for storing instructions executable by the processor;

wherein the processor, by executing the instructions, is configured to:

acquire an acoustic signal picked up by an earphone; and determine that the earphone is in a box-entering state in response to determining that the acoustic signal matches a predetermined acoustic signal in the earphone, wherein the predetermined acoustic signal is a signal obtained without modifying a structure of the earphone box, without requiring a separate speaker in the earphone box, and without requiring additional sensors.

8. The apparatus according to claim 7, wherein the predetermined acoustic signal comprises at least one of following acoustic signals:

an acoustic signal determined based on a collision between the earphone and an earphone box;

an acoustic signal generated by tapping the earphone box; or an acoustic signal through which a user sends a target instruction.

9. The apparatus according to claim 7, wherein the processor is configured to determine that the acoustic signal matches the predetermined acoustic signal in the earphone by:

determining that the acoustic signal matches the predetermined acoustic signal in the earphone in response to detecting that an attribute of the acoustic signal meets a predetermined attribute condition;

the attribute comprising at least one of the following attributes: duration, loudness, or frequency.

10. The apparatus according to claim 7, wherein the processor is further configured to, after detecting that an attribute of the acoustic signal meets a predetermined attribute condition, obtain encoding information of the acoustic signal by decoding the acoustic signal; and determine that the acoustic signal matches the predetermined acoustic signal in the earphone in response to determining that the encoding information matches target encoding information, wherein the predetermined acoustic signal is obtained by encoding the target encoding information.

11. The apparatus according to claim 7, wherein the processor is configured to acquire the acoustic signal picked up by the earphone by:

acquiring the acoustic signal picked up by a target microphone, wherein the target microphone comprises a microphone whose power consumption is lower than a threshold when data processing is performed.

12. The apparatus according to claim 7, wherein the processor is further configured to, after determining that the earphone is in a box-entering state and performing a box-entering operation, send a charging request to an earphone box in response to determining that the earphone has established a charging connection with the earphone box, wherein the charging request is used to request the earphone box to charge the earphone.

13. A non-transitory computer-readable storage medium, having stored thereon instructions which, when executed by a processor of a terminal, enable the terminal to perform acts comprising:

acquiring an acoustic signal picked up by an earphone; and determining that the earphone is in a box-entering state in response to determining that the acoustic signal matches a predetermined acoustic signal in the earphone, wherein the predetermined acoustic signal is a signal obtained without modifying a structure of the earphone box, without requiring a separate speaker in the earphone box, and without requiring additional sensors.

14. The non-transitory computer-readable storage medium according to claim 13, wherein the predetermined acoustic signal comprises at least one of following acoustic signals:

an acoustic signal determined based on a collision between the earphone and an earphone box;

an acoustic signal generated by tapping the earphone box; or an acoustic signal through which a user sends a target instruction.

15. The non-transitory computer-readable storage medium according to claim 13, wherein determining that the acoustic signal matches the predetermined acoustic signal in the earphone comprises:

determining that the acoustic signal matches the predetermined acoustic signal in the earphone in response to detecting that an attribute of the acoustic signal meets a predetermined attribute condition; and the attribute comprises at least one of the following attributes: duration, loudness, or frequency.

16. The non-transitory computer-readable storage medium according to claim 15, wherein after detecting that the attribute of the acoustic signal meets the predetermined attribute condition, the terminal is further configured to perform acts comprising:

obtaining encoding information of the acoustic signal by decoding the acoustic signal; and determining that the acoustic signal matches the predetermined acoustic signal in the earphone in response to determining that the encoding information matches target encoding information, wherein the predetermined acoustic signal is obtained by encoding the target encoding information.

17. The non-transitory computer-readable storage medium according to claim 13, wherein acquiring the acoustic signal picked up by the earphone comprises:

acquiring the acoustic signal picked up by a target microphone, wherein the target microphone comprises a microphone whose power consumption is lower than a threshold when data processing is performed.

18. The non-transitory computer-readable storage medium according to claim 13, wherein after determining that the earphone is in a box-entering state, the terminal is further configured to:

send a charging request to an earphone box in response to determining that the earphone has established a charging connection with the earphone box, wherein the charging request is used for requesting the earphone box to charge the earphone.

* * * * *